(12) United States Patent
Carlson et al.

(10) Patent No.: US 11,479,485 B2
(45) Date of Patent: Oct. 25, 2022

(54) SEQUESTERING AGENTS, KITS THEREFOR, AND METHODS OF USING SEQUESTERING AGENTS AND KITS THEREFOR

(71) Applicant: Carbonet Nanotechnologies Inc., Vancouver (CA)

(72) Inventors: Michael Carlson, Vancouver (CA); Franck Duong, Vancouver (CA)

(73) Assignee: Carbonet Nanotechnologies, Inc.

( * ) Notice: Subject to any disclaimer, the term of this patent is extended or adjusted under 35 U.S.C. 154(b) by 232 days.

(21) Appl. No.: 16/618,556

(22) PCT Filed: Jun. 1, 2018

(86) PCT No.: PCT/CA2018/050664
§ 371 (c)(1),
(2) Date: Dec. 2, 2019

(87) PCT Pub. No.: WO2018/218374
PCT Pub. Date: Dec. 6, 2018

(65) Prior Publication Data
US 2020/0087176 A1    Mar. 19, 2020

Related U.S. Application Data

(60) Provisional application No. 62/514,208, filed on Jun. 2, 2017.

(51) Int. Cl.
*C02F 1/56* (2006.01)
*C02F 1/54* (2006.01)
(Continued)

(52) U.S. Cl.
CPC ............... *C02F 1/56* (2013.01); *C02F 1/547* (2013.01); *C02F 2101/20* (2013.01);
(Continued)

(58) Field of Classification Search
None
See application file for complete search history.

(56) References Cited

U.S. PATENT DOCUMENTS 3,415,745 A    12/1968   Isaacson et al.
3,444,151 A    5/1969    Verdol et al.
(Continued)

FOREIGN PATENT DOCUMENTS

CA    1341392    10/2002
CA    2450592    6/2004
(Continued)

OTHER PUBLICATIONS

Xuan et al. (RSC Adv., 2015, 5, 84947-84958) (Year: 2015).*
(Continued)

*Primary Examiner* — Clare M Perrin
(74) *Attorney, Agent, or Firm* — Sheridan Ross P.C.

(57) ABSTRACT

Provided are sequestering agents for sequestering non-water moieties from an aqueous solution. The sequestering agents may comprise a detergent; and a polymer operable to stabilize formation of a detergent micelle thereby causing the detergent and polymer to self-assemble into a nanonet upon exposure to the aqueous solution. Also provided are kits therefore and methods for use of the sequestering agents and kits.

23 Claims, 8 Drawing Sheets

(51) Int. Cl.
*C02F 101/20* (2006.01)
*C02F 101/32* (2006.01)
*C02F 103/06* (2006.01)
*C02F 103/10* (2006.01)
*C02F 103/20* (2006.01)
*C02F 103/32* (2006.01)
*C02F 103/34* (2006.01)

(52) U.S. Cl.
CPC .... *C02F 2101/325* (2013.01); *C02F 2103/06* (2013.01); *C02F 2103/10* (2013.01); *C02F 2103/20* (2013.01); *C02F 2103/32* (2013.01); *C02F 2103/34* (2013.01); *C02F 2305/04* (2013.01)

(56) References Cited

U.S. PATENT DOCUMENTS

| | | |
|---|---|---|
| 3,580,891 A | 5/1971 | Rainer |
| 3,687,906 A | 8/1972 | Hanson et al. |
| 3,819,589 A | 6/1974 | Fauke et al. |
| 3,929,635 A | 12/1975 | Burkis et al. |
| 4,251,410 A | 2/1981 | Danner et al. |
| 4,618,655 A | 10/1986 | Dehm et al. |
| 4,966,712 A | 10/1990 | Nishibayashi et al. |
| 5,391,300 A | 2/1995 | Webb et al. |
| 5,853,596 A | 12/1998 | Gibson |
| 6,524,485 B1 * | 2/2003 | Dubin .................. B01J 20/103 210/500.1 |
| 6,830,657 B1 | 12/2004 | Betremieux et al. |
| 8,115,046 B2 | 2/2012 | Burns et al. |
| 8,933,010 B2 | 1/2015 | Scheuing et al. |
| 9,067,807 B2 | 6/2015 | Soane et al. |
| 2005/0230319 A1 | 10/2005 | Mori et al. |
| 2007/0093610 A1 | 4/2007 | Kim et al. |
| 2009/0245939 A1 | 10/2009 | Burns et al. |
| 2013/0085248 A1 | 4/2013 | Musa et al. |
| 2015/0259231 A1 * | 9/2015 | Webber .................. C02F 1/66 210/706 |
| 2018/0099884 A1 | 4/2018 | McGowan |

FOREIGN PATENT DOCUMENTS

| | | |
|---|---|---|
| CN | 1202144 | 12/1988 |
| CN | 102872836 | 1/2013 |
| CN | 103483594 | 1/2014 |
| EP | 0172154 | 11/1990 |
| GB | 929225 | 6/1963 |
| WO | WO 90/014310 | 11/1990 |
| WO | WO 98/014490 | 4/1998 |
| WO | WO 2009/151490 | 12/2009 |
| WO | WO2010117406 | 10/2010 |
| WO | WO 2012/059553 | 5/2012 |
| WO | WO 2012/170241 | 12/2012 |
| WO | WO 2016/079511 | 5/2016 |
| WO | WO 2018/218374 | 12/2018 |

OTHER PUBLICATIONS

International Search Report and Written Opinion for PCT/CA2018/050664 dated Aug. 24, 2018.

Bourgeat-Lami et al., "Polymer Encapsulation of Inorganic Particles", Chapter 4. Functional Coatings. © 2006, ISBN 3-527-31296-X.

Ladj et al., "Polymer Encapsulation of Inorganic Nanoparticles for Biomedical Applications", Internat. J. Pharm 2013 (458) 230-241. Abstract provided.

Sommertune et al., "Polymer/Iron Oxide Nanoparticle Composites—A Straight Forward and Scalable Synthesis Approach", Int. J. Mol. Sci. (2015), 16, 19752-19768.

Craig et al. "Tuning the Size of Styrene-Maleic Acid Copolymer-Lipid Nanoparticles (SMALPs) Using RAFT Polymerization for Biophysical Studies." Biochimica et Biophysica Acta, 2016, 1858 (11): 2931-39.

Liu et al. "Cooperative Self-Assembly of Nanoparticle Mixtures in Lamellar Diblock Copolymers: A Dissipative Particle Dynamics Study." Macromolecular Rapid Communications, 2006, 27 (6): 458-62.

Liu et al. "Self-Assembly of Mixtures of Block Copolymers of Poly(styrene-B-Acrylic Acid) with Random Copolymers of Poly-(styrene-Co-Methacrylic Acid)." Langmuir: The ACS Journal of Surfaces and Colloids, 2006, 22 (1): 419-24.

Long et al. "The Styrene-Maleic Acid Copolymer Extracts Active Complexes from Native Biomembranes." Biophysical Journal, Feb. 2013, 104 (2): 523a.

Maly et al. "Self-Assembly of Nanoparticle Mixtures in Diblock Copolymers: Multiscale Molecular Modeling." Industrial & Engineering Chemistry Research, 2008, 47 (15): 5023-38.

Vargas et al. "Nanoparticle Self-Assembly in Mixtures of Phospholipids with Styrene/maleic Acid Copolymers or Fluorinated Surfactants." Nanoscale2015, 7 (48): 20685-96.

* cited by examiner

Capture of dissolved or emulsified hydrocarbons

Release of captured molecules for polymer recovery

Magnetic dewatering

SEQUESTERING AGENTS, KITS THEREFOR, AND METHODS OF USING SEQUESTERING AGENTS AND KITS THEREFOR

RELATED APPLICATIONS

This present application is a National Phase entry of PCT Application No. PCT/CA2018/050664 filed Jun. 1, 2018 which claims priority to U.S. Application No. 62/514,208 filed Jun. 2, 2017, the contents of each being incorporated herein by reference in their entireties.

TECHNICAL FIELD

This invention is in the field of sequestering and more particular in the field of sequestering material from aqueous environments.

BACKGROUND

The decontamination and disposal of organic waste materials such as sewage sludge, animal manure, food processing waste, fracking fluid, oil and gas, and other industrial wastewater presents both environment and public health concerns. The handling and disposal of contaminated water has significant social, environmental, and economic implications. Currently, residual wastewater sludge is commonly digested, incinerated, deposited in landfills, returned to the same environment, or used as fertilizer through agricultural land application of the residual biosolids.

The encapsulation of inorganic particles with polymers has been demonstrated [E. Bourgeat-Lami and E. Duguet: Polymer encapsulation of inorganic particles; in Functional coatings, S. K. Ghosh (ed.); 2006, Wiley-VCH, Weinheim; Chapter 4, pp. 85-152]. In biomedical applications, the coating of inorganic nanoparticles with a polymer, or their encapsulation in a polymer matrix or layer of detergent is important for properties such as enhanced solubility [R. Ladj et al. Polymer encapsulation of inorganic nanoparticles for biomedical applications; Internat. J. Pharm. 2013 (458) 230-241]. In the fields of physics and engineering, magnetic fluids comprised of magnetic nanoparticles coated with a polymer and/or surfactant to stabilize the particle in the host liquid are studied. Various synthetic methods for the preparation of such systems have been published [e.g. J. Sommertune et al. Polymer/Iron oxide nanoparticles composites—a straight forward and scalable synthesis approach; Int. J. Mol. Sci. 2015 (16) 19752-19768].

SUMMARY

This invention is based, at least in part, on the elucidation of properties of detergents and polymers that make them suitable for use together as sequestering agents.

The present invention provides a new means to capture non-water moieties, including but not limited to organic contaminants and emulsified non-aqueous contaminants (NACs) from water, later removing them through a simple aggregation and filtration or electromagnetic process. The invention further removes contaminants that are suspended as well as dissolved in water. In this invention, a clarifying agent is directly added to an aqueous solution, such as, but not limited to, contaminated water or a contaminated material. The organic contaminants are sequestered and wrapped into detergent-oil-polymer particles which facilitate their subsequent removal. Oil and detergent particles are removed through aggregation of the polymer by protonation or cationic chelation of maleic acid groups or other functional groups on the polymer. The formulation of this polymer detergent combination results in the formation of a gel-like aggregate that are able to capture organic contaminants within minutes. The sequestering agent captures various contaminants including, but not limited to, hydrocarbons and heavy metals for a more targeted disposal of a lower volume of waste. The functionalized styrene malic acid (SMA) polymer is often particularly suitable for use due to the range of substances that can be removed. The polymer can also be regenerated and recycled from the waste, making the sequestering agent itself environmentally responsible. Specialty chemicals can also be removed from extraction mixtures with embodiments of the present invention.

Illustrative embodiments of the present invention provide a sequestering agent for sequestering non-water moieties from an aqueous solution comprising: a) a detergent; and b) a polymer operable to stabilize formation of a detergent micelle thereby causing the detergent and polymer to self-assemble into a nanonet upon exposure to the aqueous solution.

Illustrative embodiments of the present invention provide a kit for sequestering non-water moieties from an aqueous solution, the kit comprising: a) a detergent; b) a polymer operable to stabilize formation of a detergent micelle thereby causing the detergent and polymer to self-assemble into a nanonet upon exposure to the aqueous solution; and c) a precipitation agent.

Illustrative embodiments of the present invention provide a sequestering agent and/or kit described herein further comprising a precipitation agent.

Illustrative embodiments of the present invention provide a sequestering agent and/or kit described herein wherein the precipitation agent is selected from the group consisting of: an acid, a divalent cation, and mixtures thereof.

Illustrative embodiments of the present invention provide a sequestering agent and/or kit described herein wherein the precipitation agent is selected from the group consisting of: acetic acid, malic acid, hydrochloric acid, sulfuric acid, phosphoric acid, citric acid, tartaric acid, fumaric acid and lactic acid.

Illustrative embodiments of the present invention provide a sequestering agent and/or kit described herein wherein the detergent is selected from the group consisting of: a non-ionic surfactant, an anionic surfactant, a cationic surfactant, a zwitterionic surfactant, and mixtures thereof.

Illustrative embodiments of the present invention provide a sequestering agent and/or kit described herein wherein the detergent is selected from the group consisting of: Triton™, Triton X-100™, Triton X-305™, N-dodecyl-beta-D-maltoside (DDM), sodium oleate, and mixtures thereof.

Illustrative embodiments of the present invention provide a sequestering agent and/or kit described herein wherein the detergent does not form stable micelles in the absence of the polymer.

Illustrative embodiments of the present invention provide a sequestering agent and/or kit described herein wherein the detergent does form stable micelles in the absence of the polymer.

Illustrative embodiments of the present invention provide a sequestering agent and/or kit described herein wherein the detergent is a non-ionic surfactant.

Illustrative embodiments of the present invention provide a sequestering agent and/or kit described herein wherein the polymer is a block co-polymer.

Illustrative embodiments of the present invention provide a sequestering agent and/or kit described herein wherein the polymer is selected from the group consisting of: styrene-maleic acid (SMA), activated SMA, Di-isobutyl maleic acid, and mixtures thereof.

Illustrative embodiments of the present invention provide a sequestering agent and/or kit described herein wherein the polymer has a molecular weight in a range of from 3000 g/mol to about 25,000 g/mol.

Illustrative embodiments of the present invention provide a sequestering agent and/or kit described herein wherein the polymer has a molecular weight of about 22,000 g/mol.

Illustrative embodiments of the present invention provide a sequestering agent and/or kit described herein wherein the polymer is water soluble.

Illustrative embodiments of the present invention provide a sequestering agent and/or kit described herein wherein the polymer is biodegradable.

Illustrative embodiments of the present invention provide a sequestering agent and/or kit described herein wherein the ratio of detergent:polymer is in a range of from about 1:0.5 to about 1:1.3.

Illustrative embodiments of the present invention provide a sequestering agent and/or kit described herein wherein the ratio of detergent:polymer is in a range of from about 1:0.5 to about 1:1.0.

Illustrative embodiments of the present invention provide a sequestering agent and/or kit described herein wherein the ratio of detergent:polymer is in a range of from about 1:0.6 to about 1:0.8.

Illustrative embodiments of the present invention provide a sequestering agent and/or kit described herein wherein the ratio of detergent:polymer is about 1:0.7.

Illustrative embodiments of the present invention provide a sequestering agent and/or kit described herein wherein the detergent is able to form a micelle having a size of not less than about 10 kDa.

Illustrative embodiments of the present invention provide a sequestering agent and/or kit described herein wherein the detergent is able to form a micelle having a size of not less than about 40 kDa.

Illustrative embodiments of the present invention provide a sequestering agent and/or kit described herein wherein the detergent is able to form a micelle having a size of not less than about 40 kDa and not more than about 300 kDa.

Illustrative embodiments of the present invention provide a method of sequestering a non-water moiety from an aqueous solution, the method comprising adding a sequestering agent described herein to the aqueous solution comprising the non-water moiety, thereby forming a treated aqueous solution followed by removal of solid particles from the treated aqueous solution.

Illustrative embodiments of the present invention provide a method described herein further comprising mixing prior to removal of solid particles.

Illustrative embodiments of the present invention provide a method described herein wherein the removal of solid particles comprises at least one selected from the group consisting of: filtration, gravity separation, flotation and electromagnetic attraction.

Illustrative embodiments of the present invention provide a method described herein wherein the removal of solid particles comprises electromagnetic attraction and the method further comprises adding magnetic moieties to the treated aqueous solution prior to removal of the solid particles.

Other aspects and features of the present invention will become apparent to those ordinarily skilled in the art upon review of the following description of specific embodiments of the invention in conjunction with the accompanying figures.

DETAILED DESCRIPTION

Figure 1A:
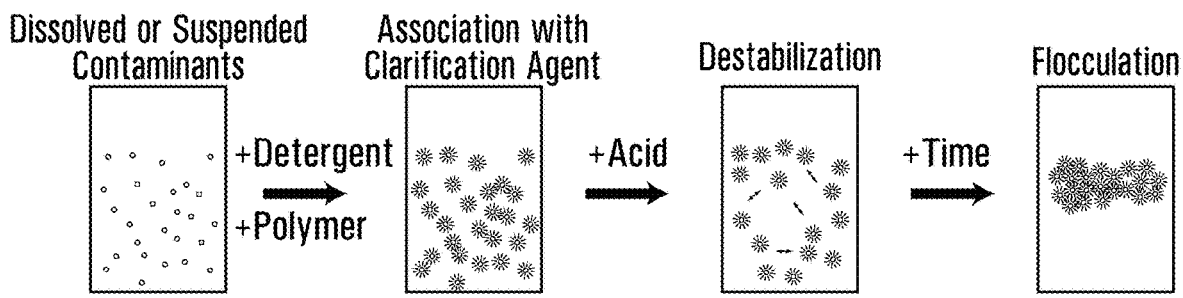
FIG. 1A: depicts a schematic of the capture process of a sequestering agent.
Figure 1B:
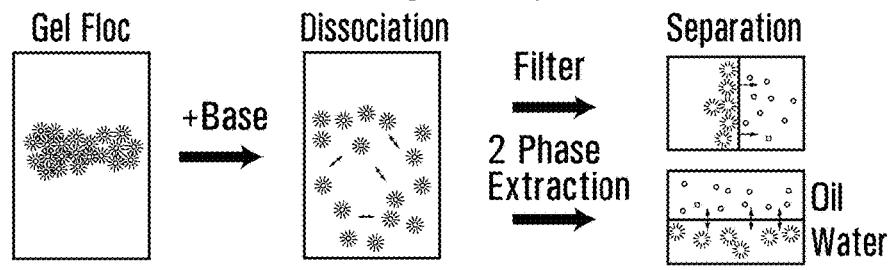
FIG. 1B: depicts a schematic of the release process of a sequestering agent.
Figure 1C:
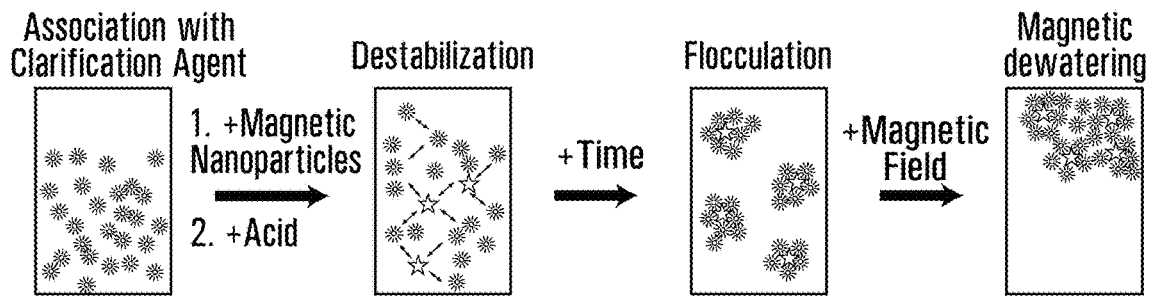
FIG. 1C: depicts a schematic of the application of magnetic nanoparticle seeding for enhanced dewatering of the resulting flocs.

Embodiments of the present invention provide sequestering agents for sequestering non-water moieties from an aqueous solution. Sequestering agents according to the present invention comprise a detergent, and a polymer. The polymer is operable to stabilize formation of a detergent micelle thereby causing the detergent and polymer to self-assemble into a nanonet upon exposure to the aqueous solution.

As used herein, the term "aqueous solution" refers to a liquid environment in which water is a major component. Examples of aqueous solutions include, but are not limited to, waste water, aqueous material recovered from a process, (such as sewage sludge, animal manure, food processing waste), oil and gas wastewater, used fracking fluid, industrial effluent, ground water and the like.

As used herein, the term "moiety" refers to a part or portion of a whole, which part or portion is divisible and different from other parts of the whole. As used herein, a "moiety" may be a whole chemical molecule or may be a portion of a chemical molecule. For example, in an aqueous sodium chloride solution, the whole would be the solution and the moieties would be water, sodium, chloride and sodium chloride and each of water, sodium, chloride, and sodium chloride are individual moieties unto themselves. As used herein, the term "non-water" moiety is a moiety which is not a water molecule. A "non-water" moiety may be suspended, dissolved and/or otherwise present in an aqueous environment. Non-water moieties may be physical, chemical, biological, and/or radiological substances. Examples of "non-water" moieties include, but are not limited to, organic moieties, emulsified non-aqueous moieties, hydrocarbons, heavy metals, oil, dissolved solids, suspended solids, ions, and heavy metals.

As used herein, the term "sequestering agent" refers to an agent that is able to isolate a non-water moiety from an aqueous environment in which the non-water moiety is found. The non-water moiety may be a contaminant or more than one contaminant that is desired to be isolated in order to de-contaminate the aqueous solution and/or may be a moiety of value that is desired to be isolated in order to obtain and/or purify the non-water moiety. In some embodiments of the present invention, the sequestering agent is a nanonet. In some embodiments, the sequestering agent is a mixture of moieties that are able to form a nanonet upon exposure to an aqueous environment. In some cases a "sequestering agent" may be referred to as a "clarifying agent" and often the terms "sequestering agent" and "clarifying agent" may be used interchangeably.

As used herein, the term "micelle" refers to an aggregate of molecules in a colloidal solution.

As used herein, the term, "nanonet" refers to a structure wherein a micelle, which micelle is formed by a detergent, interacts with a polymer and the nanonet self-assembles in an aqueous environment. The self-assembly of the nanonet often occurs via the initiation of the interaction between the polymer and the micelle. Often the interaction between the polymer and the micelle results in stabilization of the micelle thereby making the micelle more resistant to break-up. In some embodiments, the polymer wraps around an outside surface of the micelle. The polymer may wrap around the whole of the outside surface, most of the outside surface or a portion of the outside surface of the micelle.

As used herein, the term "detergent" refers to a surfactant or a mixture of surfactants. Often the detergent has cleaning properties such that the surfactant combines with a non-water moiety thereby increasing solubility of the non-water moiety. Furthermore, "detergents", as used herein, refers to surfactants that are able to form micelles. Some of these micelles may be stable micelles on their own and others may not be stable unless a secondary material is present to stabilize the micelle. For those micelles that are not stable unless a secondary material is present, typically, they are added at a concentration at or higher than their critical micelle concentration (CMC) and after the polymer is added to the micelles, thereby forming a nanonet. Once the nanonets are formed, if dilution of the detergent occurs, thereby lowering the concentration of the detergent to below its CMC, the micelles in the nanonets remain stable despite the detergent being at a concentration below the CMC.

Sequestering agents of the present invention comprise a polymer. Polymers for use in sequestering agents of the present invention are available commercially. Often, the polymer is water soluble. Often, the polymer is biodegradable. The polymer often has a molecular weight in a range of from about 3000 g/mol to about 25,000 g/mol. The polymer often has a molecular weight of about 22 kDa. The polymer may also be a mixture of suitable polymers. The polymer is often a block co-polymer. The term "block co-polymer" is used herein to refer to a co-polymer with two or more homopolymer subunits, such as di-isobutylene maleic acid copolymer (DIBMA). Often the polymer is amphipathic, having a hydrophilic portion and a hydrophobic portion. Often the block co-polymer is made up of a hydrophobic subunit and a hydrophilic subunit. In some embodiments the ratio of hydrophobic to hydrophilic subunits is 1:1, 2:1, 3:1 or more and any ratio in between 1:1 and 3:1. In some embodiments, the polymer is a maleic acid polymer, a styrene-maleic acid (SMA) polymer or an activated SMA polymer. A SMA polymer is a synthetic polymer built-up of styrene and maleic anhydride monomers. An activated SMA polymer is an SMA polymer where the styrene maleic anhydride is hydrolyzed to maleic acid. Often the polymer is SMA2021™ Often the polymer is SMA 2000™.

Sequestering agents of the present invention comprise a detergent. In some embodiments, the detergent is able to form a micelle having a size of not less than about 10 kDa. In some embodiments, the detergent is able to form a micelle having a size of not less than about 40 kDa. In some embodiments, the detergent is able to form a micelle having a size of not less than about 40 kDa and not more than about 300 kDa. In some embodiments, the detergent is able to form a micelle having a size in a range of from about 10 kDa to about 3000 kDa. In some embodiments, the detergent does form stable micelles in the absence and/or presence of the polymer. In some embodiments, the detergent does not form stable micelles in the absence of the polymer. In some embodiments, the detergent only forms stable micelles in the presence of the polymer. In some embodiments, the detergent does form stable micelles in the absence of the polymer.

Detergents suitable for use in the present invention have a critical micelle concentration. The critical micelle concentration (CMC) refers to the concentration of detergent in an aqueous solution above which micelles will form and additional detergent molecules will also form and/or become part of a micelle. Some non-water moieties found in aqueous solutions are able to disrupt, disturb, destabilize and/or generally interfere with the formation of micelles. The addition of the polymer is able to stabilize micelle formation below the CMC and/or counteract the interference of the non-water moiety. For a detergent to be suitable for use in the present invention, the CMC of the detergent in the presence of the polymer should be used when forming the nanonet.

In some embodiments, the detergent may be a non-ionic surfactant, an anionic surfactant, a cationic surfactant, a zwitterionic surfactant, and/or a mixture thereof. In some embodiments, the detergent may be a Triton™ detergent, Triton X-100™, Triton X-305™, N-dodecyl-beta-D-maltoside (DDM), sodium oleate, and/or mixtures thereof.

Sequestering agents of the present invention comprise a ratio of detergent:polymer. As used herein, these detergent: polymer ratios are set out in terms of a 'wt/wt' ratio. That is, if the ratio is 1:1, then the same weight of each is used (e.g. 1 g of detergent and 1 g of polymer). Further, if the ratio is 2:1, then twice as much weight of detergent is used when compared to the weight of polymer used (e.g. 4 g of detergent and 2 g of polymer) In some embodiments of the present invention, the detergent:polymer ratio is in a range of from about 1:0.5 to about 1:1.3. In some embodiments of the present invention, the detergent:polymer ratio is in a range of from about 1:0.075 to about 1:1.4. Often the ratio is in a range of from about 1:0.5 to about 1:1.0. In some embodiments of the present invention, the detergent:polymer ratio is in a range of from about 1:0.6 to about 1:0.8. In some embodiments of the present invention, the detergent: polymer ratio is about 1:0.7. In some embodiments of the present invention, the detergent:polymer ratio is about 1:0.75.

In some embodiments of the present invention the sequestering agent comprises a detergent, a polymer, and a precipitation agent. The precipitation agent is operable to encourage and/or induce aggregation of the sequestering agents. Such aggregation facilitates removal of the sequestering agents from the aqueous solution. In some embodiments, the precipitation agent encourages and/or induces flocculation of the sequestering agents. Often the precipitation agent is an acid, a divalent cation, and/or mixtures thereof. Often the precipitation agent is acetic acid, malic acid, citric acid, tartaric acid, fumaric acid, lactic acid and/or mixtures thereof. In some embodiments, the precipitation agent is a magnetic moiety, which encourages aggregation upon exposing a magnetic force to an aqueous solution treated with a sequestering agent of the present invention. Often the magnetic moiety is a moiety that is able to be sequestered by the sequestering agent. In some embodiments, the precipitation agent is a non-water moiety that is present in the aqueous solution and is able to be sequestered by the sequestering agent.

The polymer may be aggregated by protonation or cationic chelation of maleic acid groups or other functional groups on the polymer. When the polymer is stabilizing micelles of the detergent, this aggregation results in the formation of a gel-like aggregate that sequesters non-water moieties in the aqueous solution. Often this occurs within minutes of the protonation or cationic chelation. Mixing of the sequestering agents of the present invention in the aqueous solution may encourage faster and more complete aggregation. The gel-like aggregates may then be removed via various methods known in the art for separating solids from liquids, including filtration, gravity separation, flotation, or electromagnetic processes. Once separated from the aqueous solution, the polymer can often be regenerated and reused.

Embodiments of the present invention also provide a kit. Kits of the present invention provide the components for sequestering non-water moieties from an aqueous solution. Often the kit comprises a detergent, a polymer and a precipitation agent. The detergent, the polymer and precipitation agent suitable for use in kits of the present invention are the same as those described herein for use in sequestering agents. Instructions for use of the components found in the kit may also be provided in kits of the present invention. Kits of the present invention may comprise the components of any one or more of the sequestering agents described herein and may further comprise instructions for use of those components.

Examples of aqueous solutions that suitable to be treated using sequestering agents of the present invention include, but are not limited to, waste water, aqueous material recovered from a process, (such as sewage sludge, animal manure, food processing waste), oil and gas wastewater, used fracking fluid, industrial effluent, ground water and the like. Often, up to 60% of contaminants are aggregated, or up to 70% of contaminants, or up to 80% of contaminants, or up to 90% of contaminants, or up to 95% of contaminants or over 99% of contaminants are aggregated. Using sequestering agents of the present invention can result in an aqueous solution having, after treatment, a suspended solids content in the range of from about 0.05% to about 5%; or from about 0.05% to about 10% or from about 05% to 30%. While the starting pH of the aqueous solution to be treated may be any pH, it is often preferable to have a pH in a range of from about 2 to about 11, or more preferably from about 3 to about 11, or most preferably from about 4 to about 11. Furthermore, while the concentration of alkaline earth metals in the aqueous solution to be treated may be any concentration, it is often preferable to have a concentration of less than about 20 mM, or less than about 15 mM, or less than about 10 mM.

Embodiments of the present invention also provide a method of sequestering a non-water moiety from an aqueous solution. The method may comprise adding a sequestering agent as described herein to an aqueous solution comprising a non-water moiety, thereby forming a treated aqueous solution. Once the treated aqueous solution is formed, removal of solid particles from the treated aqueous solution may be undertaken. The removal of the solid particles may be to obtain a cleaner aqueous solution or may be to obtain the solid particles or may be for both obtaining a cleaner solution and obtaining the solid particles. In such methods, it is sometimes beneficial to mix and/or agitate the treated aqueous solution prior to removing the solid particles. Such mixing may encourage and/or improve sequestering of non-water moieties and/or may encourage and/or improve aggregation.

In methods of the present invention, removal of the solid particles may be achieved by one or more of filtration, gravity separation, flotation and/or electromagnetic attraction. In embodiments of methods that include electromagnetic attraction, it is optional to add a magnetic moiety, such as iron-oxide particles and/or nanoparticles, prior to removal of the solid particles. The addition of the magnetic moiety may be before or after the addition of the detergent and/or polymer and/or precipitation agent and/or mixing. The magnetic moiety may be sequestered by the sequestering agent and when a magnetic force is applied the magnetic moiety, sequestered by the sequestering agent, may be attracted to the magnetic force or may be repelled by the magnetic force, thereby encouraging a concentration of the sequestering agent, which may facility removal of the solid particles.

In some embodiment of the present invention, there is provided a method for decontaminating water. The method may comprise adding detergent to the contaminated water, adding a polymer, adding one or more precipitating agents, to aggregate the contaminants into a gel-like aggregates, and filtering the waste solids from the liquid.

In some embodiments of the present invention, there is provided a method for decontaminating water. The method may comprise adding a detergent to the contaminated water, adding iron-oxide nanoparticles coated in polymer to the contaminated water, adding a precipitating agent, mixing to aggregate the contaminants into a gel-like particle, and removing the waste solids with a magnetic force.

In some embodiments, the methods of the invention may further comprise recovering the polymer after removing the solid particles. The method my comprise neutralizing the waste products with base, dissolving the polymer, and filtering the waste product and/or using a 2-phase oil/water extraction to capture the dissolved polymer in aqueous solution.

In some embodiments of the present invention, there is provided a method for recovering high value chemicals. The method may comprise adding a detergent to the extraction mixture, adding polymer, adding a precipitating agent to capture the high value chemicals, mixing to aggregate the high value chemicals into a gel-like particle, removing the gel-like particles.

EXAMPLES

The following examples are illustrative of some of the embodiments of the invention described herein. These examples do not limit the spirit or scope of the invention in any way.

Example 1

Preparation of hydrolyzed polymer. 3 g of SMA 2021™ is mixed into 30 mL of 1M KOH and refluxed at 85° C. for 3 hours. The polymer is removed from the KOH solution by precipitation through addition of 6M HCl with vigorous stirring. The precipitated polymer is washed 3× with 50 mM HCl before resuspension in $dH_2O$ and adjusted to pH 8 to facilitate dissolution.

Example 2

The clarifying agent formulation (0.15% SMA 2021™, 0.1% Tx-100) was added to 1 mL of contaminated fresh water and mixed by vortex for 10 seconds. Addition of 30 mM HCl was used to stimulate precipitation, followed by mixing through tube inversion (3×).

The aggregate was then left for 5 minutes to form a gel matrix.

Example 3

The clarifying agent described is a mixture of SMA and detergent at a 1:1 to 1.4:1 ratio. To find this ratio Triton X-100™ was titrated against a constant concentration of SMA (Table 1). A gel aggregate which captured all the oil was formed when both SMA and Triton X-100™ were both present at 0.05% (wt/vol and vol/vol respectively). The density of Triton X-100™ is 1.07 g/L, so this is effectively a 1:1.07 wt/wt ratio. Above this ratio the excess Triton X-100™ begins to break the gel aggregate apart and oil is left in the solution. The inverse experiment was repeated with a titration of SMA, and again the optimal ratio for complete capture of oil and SMA was found to be 1:1.07 (wt/wt) (Table 2). While the optimal ratio was found to be approximately 1:1 (wt/wt) in this experiment, the amount of SMA in the small tube was difficult to remove with the small entry. Thus the ratio of SMA to Triton X-100™ was decreased to 0.7:1 for future experiments with no decrease in oil capture efficiency. In previous experiments, a ratio of 1.4:1 (SMA:Triton X-100™) had also been utilized. Thus, the optimal ratio range can be taken as 0.07:1 up to 1.4:1 SMA:Triton X-100™ (wt/wt).

TABLE 1

Effect of different detergent concentrations on relative coagulation of emulsified oil. Effect of Triton X-100 ™ on capture of oil with described clarifying agent. Increasing concentrations of Triton X-100 ™ were included before precipitation was initiated with 30 mM HCl. Reported values are the results of said precipitation after 5 minutes.

| [SMA] | | | 0.05% | | |
|---|---|---|---|---|---|
| [Triton X-100 ™] | 0% | .05% | 0.1% | 0.2% | 0.4% |
| % Oil Capture | 0 | 100 | 50 | 0 | 0 |

TABLE 2

Effect of different polymer concentrations on relative coagulation of emulsified oil. Effect of SMA on capture of oil with described clarifying agent. Increasing concentrations of SMA were included before precipitation was initiated with 30 mM HCl. Reported values are results of said precipitation after 5 minutes.

| [Triton X-100 ™] | | | 0.1% | | |
|---|---|---|---|---|---|
| [SMA] | 0% | .025% | 0.05% | 0.1% | 0.2% |
| % Oil Capture | 0 | 0 | 50 | 100 | 100 |

Example 4

Figure 2A:
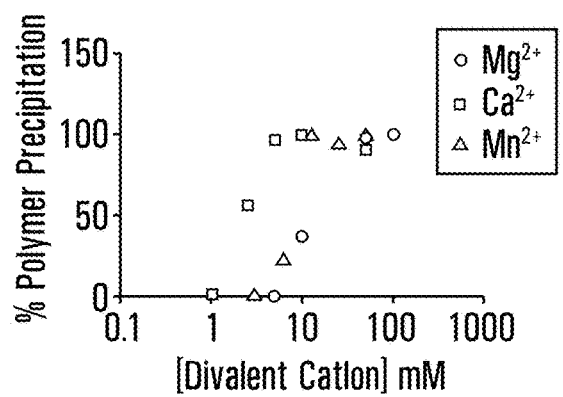
FIG. 2A: depicts graphically the results from Table 3 in Example 4.
Figure 2B:
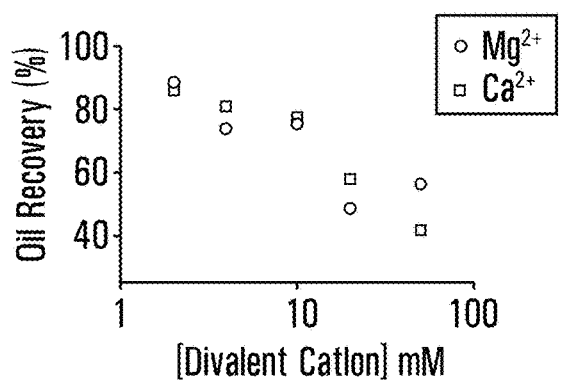
FIG. 2B: depicts graphically the results from Table 4 in Example 4.

Styrene maleic acid (SMA) contains repeating maleic acid groups, making it sensitive to precipitation by acids or divalent cations. Two common divalent cations found in ground water are $Mg^{2+}$ and $Ca^{2+}$. Titrations of the polymer in buffer A containing the respective cations found that 100% precipitation of the polymer occurred in 5 mM $Ca^{2+}$ and 50 mM $Mg^{2+}$ (Table 3 and FIG. 2A). An additional titration was done with $Mn^{2+}$, which exhibited 100% precipitation at a concentrations≥10 mM. This result shows that divalent cations will show varying strengths of precipitation on the polymer. Nevertheless, the clarifying agent was still effective at removing oil from a solution containing concentrations of $Mg^{2+}$ and $Ca^{2+}$ cations up to 10 mM, recovering approximately 75% of the oil despite precipitation before addition of acid (Table 4 and FIG. 2B). However, as divalent concentrations increase there is a clear decrease in oil recovery, suggesting that at divalent cation concentrations greater than 10 mM the clarifying agent will not perform as required.

TABLE 3

Effect of divalent cations on polymer precipitation (%). Divalent cation mediated precipitation of SMA in the described clarifying agent. Clarifying agent (0.075% SMA, 0.1% Triton X-100 ™) was added to Buffer A (50 mM Tris-pH 7.9, 50 mM NaCl) supplemented with the indicated concentration of divalent cation. The solution was mixed by vortexing to ensure break up of large aggregates, then the turbidity measure at 600 nm.

|  | Concentration (mM) | | | | | |
| --- | --- | --- | --- | --- | --- | --- |
|  | 0 | 2.5 | 5 | 10 | 50 | 100 |
| $Ca^{2+}$ | 0 | 56 | 96 | 100 | 100 | 100 |
| $Mg^{2+}$ | 0 | 0 | 0.5 | 37 | 97 | 100 |
| $Mn^{2+}$ | 0 | 0.5 | 23 | 100 | 100 | 100 |

TABLE 4

Effect of divalent cations on oil recovery efficiency (%) by clarifying agent. Oil recovery efficiency of 2% N-decane in Buffer A supplemented with the indicated divalent cation.

|  | Concentration (mM) | | | | | |
| --- | --- | --- | --- | --- | --- | --- |
|  | 0 | 2 | 4 | 10 | 20 | 50 |
| $Ca^{2+}$ | 75 | 87 | 80 | 77 | 58 | 41 |
| $Mg^{2+}$ | 93 | 88 | 74 | 75 | 48 | 56 |

Figure 2C:
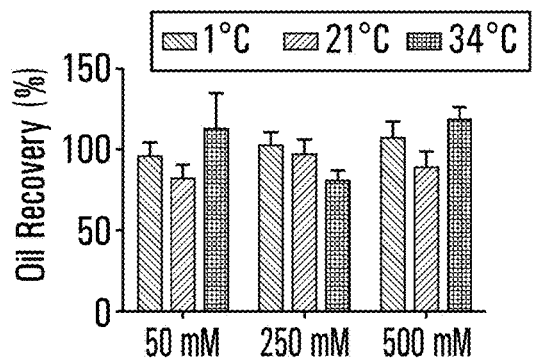
FIG. 2C: depicts graphically the results from Table 5 in Example 4.

Due to the varied salt concentrations of different target water samples, the clarifying agent was tested at 50 mM, 250 mM, and 500 mM NaCl. There was no significant effect on oil recovery efficiency due to increasing concentrations of NaCl (Table 5). Similarly, there was no significant change in recovery efficiency with temperature (Table 5 and FIG. 2C). However, there was a clear change in the nature of the aggregate formed at 1° C. At this temperature, instead of a single gel-like aggregate, the clarifying agent produced many smaller aggregates which clustered together at the air-water interface (data not shown). However, it is important to note that the clarifying agent still captures the oil (Table 5). This is in contrast to precipitation of SMA without detergent, which also makes small aggregates but does not capture oil or concentrate itself at the surface of the water (Table 1). In addition, at lower temperatures the concentrating effect was more complete, all the available precipitate rose to the top of the solution, while at higher temperatures some free SMA-Triton™ precipitates remained suspended in solution and did not enter the gel aggregate. Gel aggregate formation occurred with far greater speed at higher temperatures, effectively not forming at an aggregate after 15 min of incubation on ice but after only 30 seconds at 34° C. (Table 5).

TABLE 5

Effect of NaCl and temperature on oil recovery efficiency (%) by clarifying agent. Oil Recovery efficiency of 2% N-decane with clarifying agent in increasing monovalent salt concentrations. The experiment was repeated three times each at 1, 21, and 34° C. Precipitated oil/gel aggregate was physically removed from the surface of the solution with a spatula. At 1° C. the oil was effectively captured, but the gel aggregate fell apart as it was removed with a spatula. Consequently, the precipitate was removed from the surface with a pipette for all experiments done at 1° C.

|  | Temperature | | |
| --- | --- | --- | --- |
|  | 1° C. | 21° C. | 34° C. |
| 50 mM NaCl | 79 +/− 8 | 67 +/− 8 | 94 +/− 18 |
| 250 mM NaCl | 85 +/− 7 | 81 +/− 8 | 67 +/− 5 |
| 500 mM NaCl | 89 +/− 9 | 74 +/− 9 | 98 +/− 7 |

Example 5

Figure 2D:
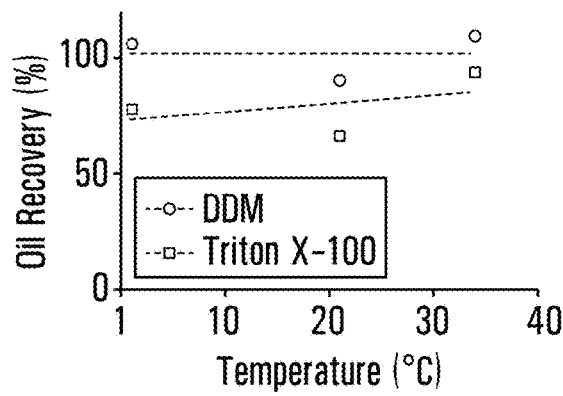
FIG. 2D: depicts graphically the results from Table 6 in Example 5.
Figure 3A:
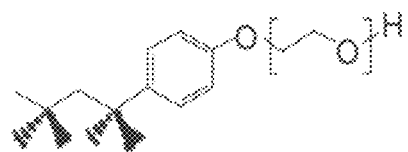
FIG. 3A: depicts the chemical structure of Triton X-100™.
Figure 3B:
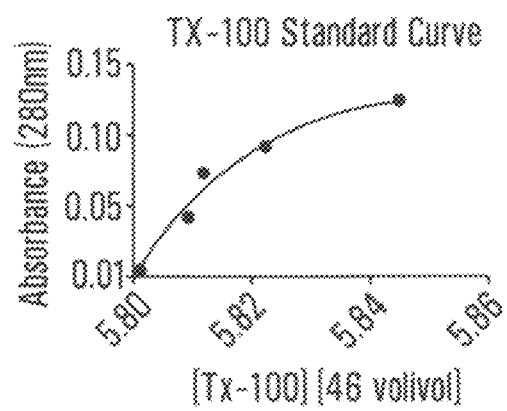
FIG. 3B: depicts the standard curve of Triton X100™ absorbance at 280 nm.
Figure 3C:
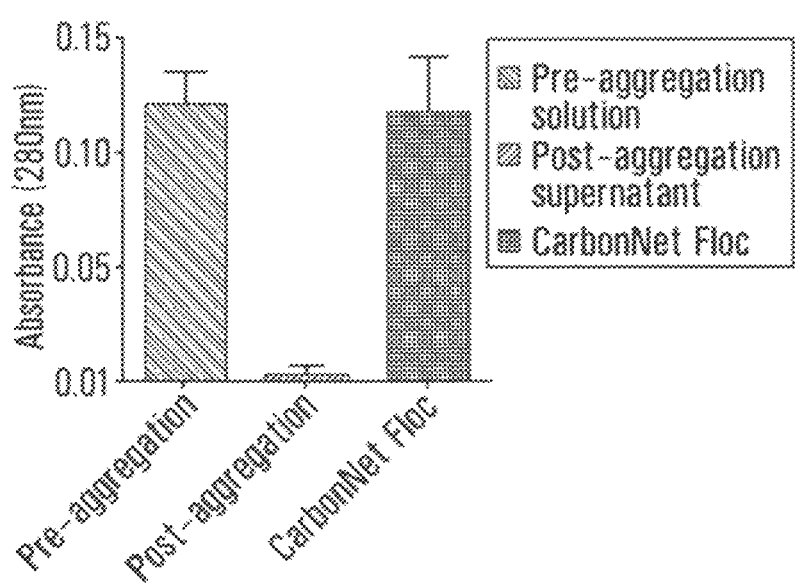
FIG. 3C: depicts graphically the results from Table 8 in Example 8.

N-Dodecyl β-D-maltoside (DDM) has a similar critical micelle concentration (0.01%) and micelle size (70 kDa) to Triton X-100™ (0.02% and ≈90 kDa, respectively). Interestingly, DDM is also able to act in the clarifying agent to form precipitated gel aggregates. This allows for slightly higher extraction efficiency at the three temperatures tested (Table 6 and FIG. 2D).

TABLE 6

Effect of detergent substitution on oil recovery efficiency (%) by clarifying agent at different temperatures. Comparison of clarifying agent effectiveness with an alternative detergent. Oil was removed from solutions containing Buffer A at 1, 21 and 34° C. utilizing a clarifying agent containing DDM (0.2%) or Triton X-100 ™ (0.1%).

|  | Temperature | | |
| --- | --- | --- | --- |
|  | 1° C. | 21° C. | 34° C. |
| DDM | 100 | 91 | 100 |
| Tx-100 | 79 | 67 | 94 |

Example 6

Synthesis of Iron oxide-SMA coated nanoparticles. A solution of 1.3M $FeCl_2$, 0.65M $Fe_2SO_4$ was prepared in 0.4M HCl. All solutions, unless otherwise noted, were degassed through bubbling with $N_2$ for 30 min. Undissolved iron oxide was filtered through Whatman™ filter paper. 20 mL of the filtered solution is then centrifuged for 10 min at 3K to further small particles of aggregated or undissolved iron. Remove 10 mL of the supernatant and add dropwise into 0.9M NaOH (degassed) under vigorous stirring over the course of 20-30 min. Upon full addition of the solution, let the black precipitate continue to stir for an additional 30 min. Decant iron particles into vials, and use a magnet to concentrate the produced magnetic particles. Wash the particles 3× with degassed water by spinning down the particles (3K 10 min). Take the pellet, then resuspend in 0.01M HCl (50 mL). This should form small nanoparticles, so some of the particles will not spin down at this point. Spin down solution, and resuspend the pellet in 500 uL of HCl 0.01M HCl. Add this solution dropwise to 0.3% SMA (50 mL), pH 9 at 90° C. (degassed). Bubble the solution for 30 min at 90° C. to ensure particle formation. Remove from heat and isolate particles through centrifugation (3K 10 min). Wash particles 2× with MQ water, then bring back up in 20 mL of MQ water. Analyze particle size using dynamic light scattering. This should give a solution with poor PDI (approximately 0.3), with an average particle diameter of 0.4 nm. Upon filtration with a 0.2 uM filter (PVDF), the PDI will improve to 0.15 with an average particles size of 140 nm. Confirm the particles are still affected by magnetic field. If there is SMA present, the particles should display a faster response to a magnetic field in the presence of acid, as the particles aggregate in the acid solution due to SMA precipitation.

Example 7

Di-isobutyl maleic acid is another anionic block co-polymer that is easier to degrade than SMA due to its lack of aromatic groups.

Figure 4A:
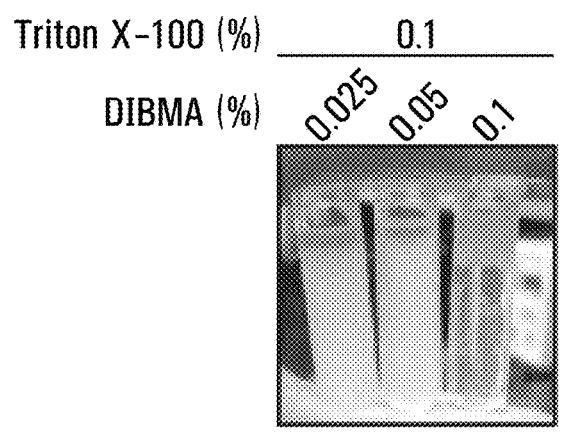
FIG. 4A: depicts the results of a titration of DIBMA (at 0.025%, 0.05% and 0.1%) with 0.1% Triton X-100™ from Example 7.
Figure 4B:
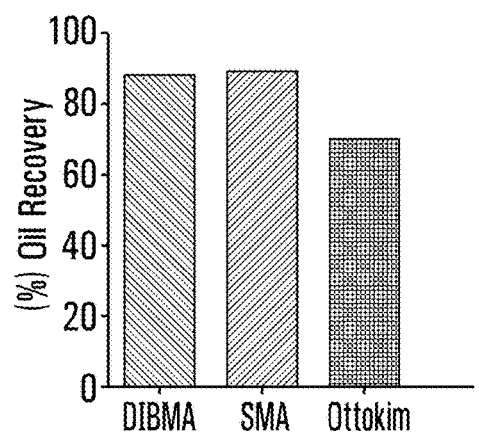
FIG. 4B: depicts graphically the results from Table 7 in Example 7.
Figure 4C:
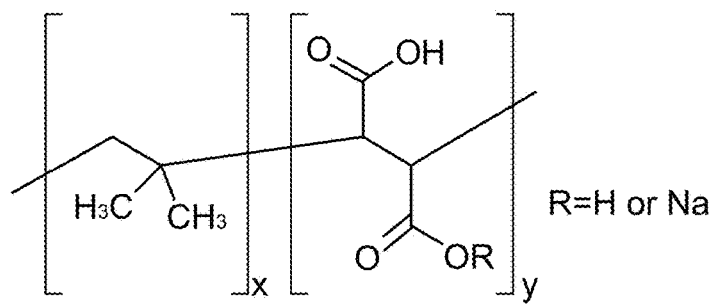
FIG. 4C: depicts the chemical structure of the repeating functional units of DIBMA.

Titration of DIBMA (at 0.025%, 0.05% and 0.1%) with 0.1% Triton X-100™ results in full encapsulation of oil at a 1:1 concentration. The results are shown in FIG. 4A.

Replacement of SMA with DIBMA in the clarifying agent leads to a similar oil recovery efficiency (Table 7), indicating that other block co-polymers containing a hydrophobic functional group as well as a maleic acid, can function in the clarifying agent.

TABLE 7

Effect of polymer substitution on oil recovery efficiency (%) by clarifying agent at room temperature (21° C.). Di-isobutylene-co-maleic acid (DIBMA) can be substituted for SMA to rapidly coagulate and aggregate emulsified oil. Oil recovery from a 0.5% oil-water mixture using a 1:1 formulation of polymer to detergent. Coagulated oil was removed by scooping the coagulated polymer from the water surface.

| | Oil recovery % (at 21° C.) |
|---|---|
| DiBMA | 88 |
| SMA | 89 |
| Oil Skim | 67 |

Example 8

To ensure that both the detergent and polymer are trapped in the flocs, the absorbance of the clarified solution and pelleted floc was measured. Accordingly, it is found that 98% of the clarifying agent (polymer and detergent) is retained in the pellet, while only 1.9% is left in solution (Table 8).

TABLE 8

Encapsulation of detergent and SMA in coagulated flocs. Clarifying agent additives are fully destabilized upon addition of acid. Both Tx-100 and SMA absorb at 280 nm. Quantitation of the clarifying agent (0.05% Tx-100, 0.05% SMA) before and after aggregation induced by acid was reported as a percentage of the starting absorbance value. The coagulated floc was removed by centrifugation, dissolved in an equivalent volume of base, and the absorbance re-measured to confirm capture of Tx-100. Standard deviation is reported from three separate experiments.

| Pre-Acid Treatment | Coagulated Floc | Clarified Water |
|---|---|---|
| 100 +/− 12 | 98 +/− 19 | 1.9 +/− 3 |

Example 9

Action of the clarifying agent on capture of a mixture of N-decane and soil-fines. Addition of clarifying agent to suspended soil fines and precipitation leads to rapid clarification of the solution. As soil fines are resistant to settling, coagulation increases their effective weight and can lead to better clarification by simple settling of the solution (Table 9). It was noted that almost all of the soil fines had settled after addition of clarifying agent, thus most of the turbidity measured was due to coagulated polymer that was not incorporated into settled fines. However, addition of a filtration step is able to effectively remove all the soil fines, as well as free-floating flocs, from solution after coagulation (Table 9). Furthermore, addition of SMA-coated magnetic nanoparticles, followed by addition of the clarifying agent, also allow more efficient clarification of the water by application of a magnetic field (Table 9). Without the clarifying agent, there is little to no effect of the magnetic nanoparticles, and soil fines are too small to be effectively filtered (Table 9).

TABLE 9

Effect of clarification agent treatment in combination with removal methods for the clarification of suspended soil fines. Water contamination is reported as the relative turbidity (absorbance measured at 550 nm). Water purified by reverse osmosis has a relative turbidity of 0. Nanomagnet seeding consist of addition of SMA coated magnetic nanoparticles and application of a magnetic field to expedite settling and clarification of the solution. Capture of suspended soil fines. Experimental set-up to acquire contaminated water was as follows: 5 grams of pre-wetted soil was contaminated with 200 micro-liters of N-decane. Soil was treated by washing with 0.1% Triton X-100 ™ solution. The subsequent eluate was treated with the clarifying agent to clarify the water and remove emulsified oil and suspended soil fines for disposal. Soil washing eluate was diluted 2X in MQ water and 0.05% SMA added before addition of acid. The reported values are turbidity measurements from supernatants after the selected treatments on soil-washing eluate. Nanomagnet seeding, in combination with a magnetic field, was utilized to rapidly dewater flocs, leading to a clarified solution only in the presence of clarifying agent.

| Clarification Method | Settling (5 min) | Filtration 11 μM pore | Nanomagnet seeding (30 sec) |
|---|---|---|---|
| Untreated | 0.704 | 0.482 | 0.718 |
| +Clarifying agent | 0.403 | 0.014 | 0.105 |

Example 10

Size exclusion elution profiles for nanonets formed with SMA 2021™ and Triton X-100™.

Figure 5A:
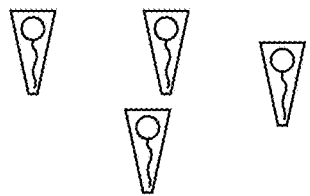
FIG. 5A: depicts the chromatogram of the elution of the polymer SMA 2021™ as described in Example 10, together with a depiction of the polymer.
Figure 5A:
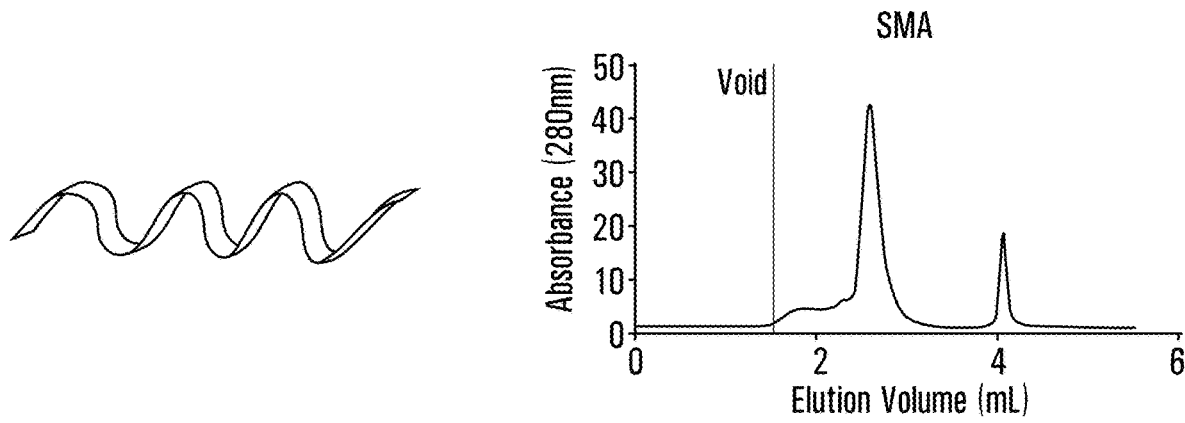
Figure 5B:
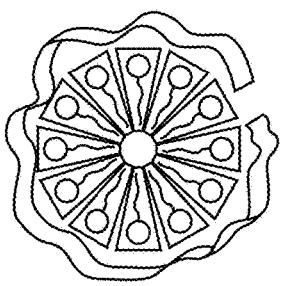
FIG. 5B: depicts the chromatogram of the elution of the detergent Triton X-100™ as described in Example 10, together with a depiction of the detergent.
Figure 5B:
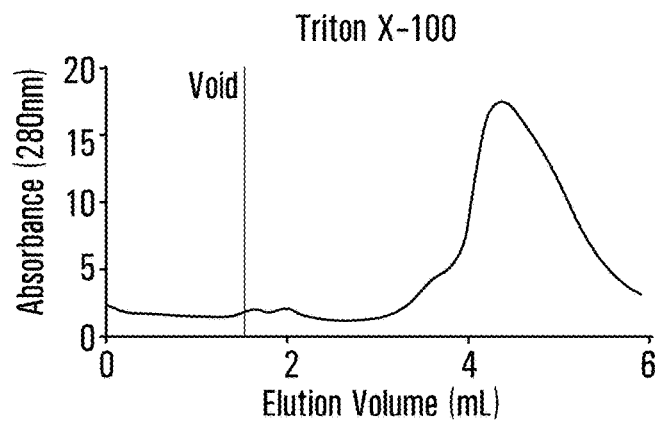
Figure 5C:
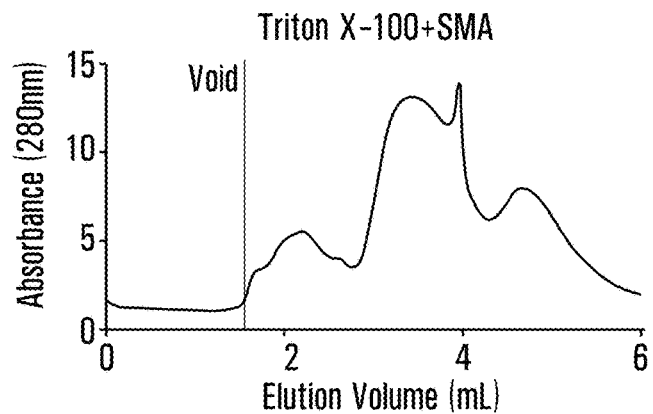
FIG. 5C: depicts the chromatogram of the elution of the nanonet comprising polymer SMA 2021™ and the detergent Triton X-100™ as described in Example 10, together with a depiction of the nanonet.

The non-ionic detergent Triton X-100™ was mixed with a SMA polymer preparation (SMA 2021™) at a 1:1 mass ratio (0.02% mass/vol), causing self-assembly of the nanonets. The SMA 2021™ is a heterogeneous polymer preparation with Mn (g/mol)=12,000 and Mw (g/mol) of 21,000. The Triton™ detergent micelle falls apart as it interacts with the column media and elutes late in the chromatogram (4.5 mL—FIG. 5A). Addition of the SMA polymer stabilizes the detergent micelle so that detergent and polymer elute together, around 3.7 mL (FIG. 5B). The SMA polymer alone is fully soluble and elutes as a sharp peak at 2.8 mL (FIG. 5C).

Example 11

Size exclusion elution profiles for nanonets formed with SMA 2021™ and sodium oleate.

Figure 6A:
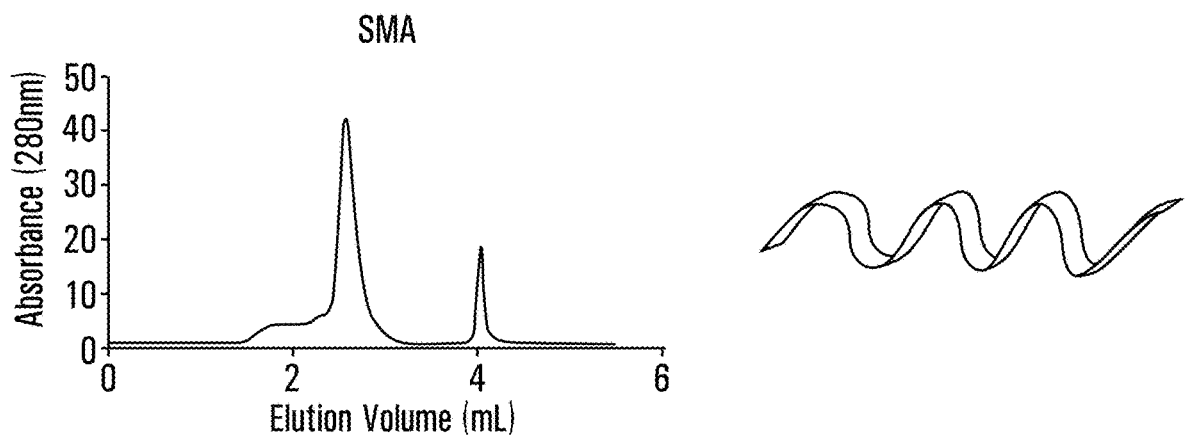
FIG. 6A: depicts the chromatogram of the elution of the polymer SMA 2021™ as described in Example 11, together with a depiction of the polymer.
Figure 6B:
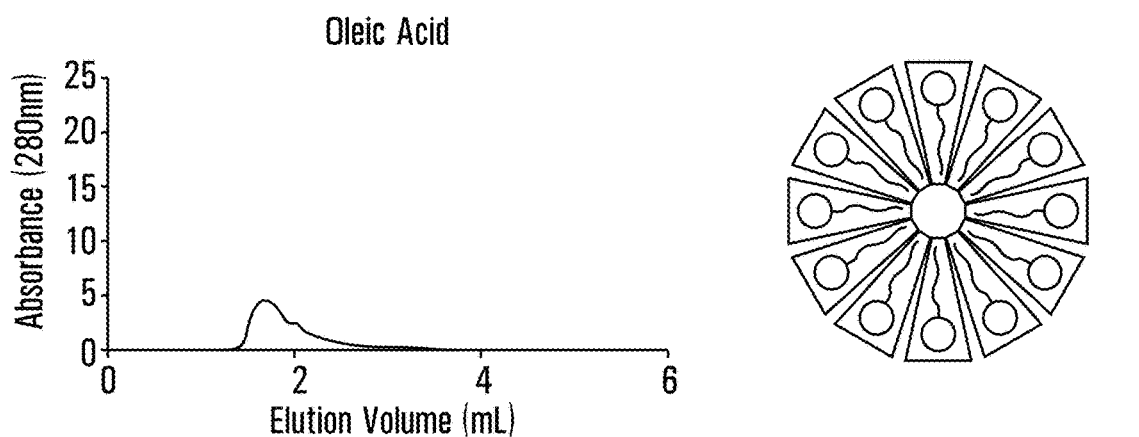
FIG. 6B: depicts the chromatogram of the elution of the detergent sodium oleate as described in Example 11, together with a depiction of the detergent.
Figure 6C:
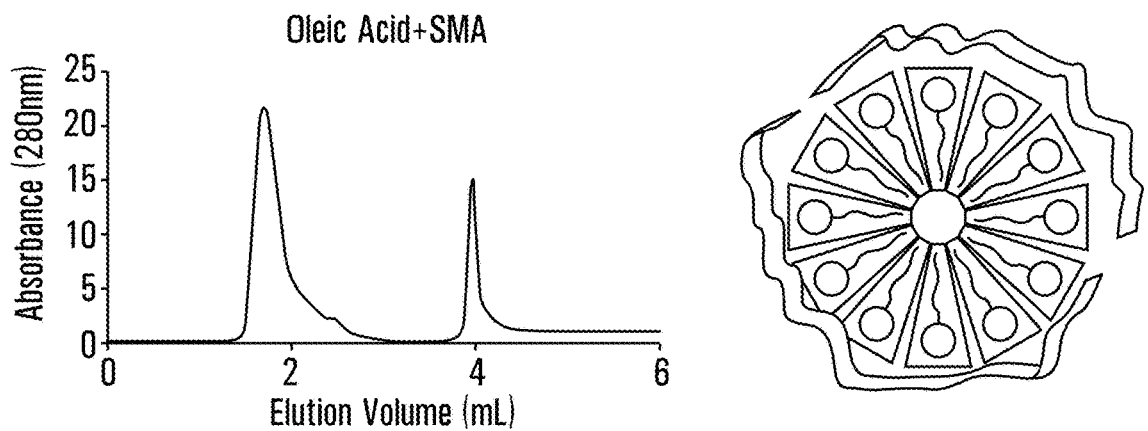
FIG. 6C: depicts the chromatogram of the elution of the nanonet comprising polymer SMA 2021™ and the detergent sodium oleate as described in Example 11, together with a depiction of the nanonet.

The ionic detergent sodium oleate was mixed with a SMA polymer preparation (SMA 2021™) at a 1:1 mass ratio (0.2% mass/vol), causing self-assembly of the nanonets. Alternatively, equivalent amounts of just polymer or just detergent were injected. SMA 2021™ is a heterogeneous polymer preparation with Mn (g/mol)=12,000 and Mw (g/mol) of 21,000. The sodium oleate detergent micelle is very large (30 nm) and elutes in the void of the size exclusion chromatogram (1.6 mL—FIG. 6A). The SMA polymer alone is fully soluble and elutes as a sharp peak at 2.8 mL (FIG. 6B). Addition of the SMA polymer causes self-assembly of the polymer and detergent micelle so that detergent and polymer elute together, around 1.7 mL (FIG. 6C).

The following Examples 12 and 13 use at least one detergent from the following table and the table provides some relevant properties of these detergents.

| Detergent | Mw | Aggregation Number (n) | Micelle Size | Alkyl chain length | Micelle Stabilization |
|---|---|---|---|---|---|
| Sodium Cholate | 430.55 | 2-3 | ≈0.8 kDa | 10 | No |
| Sodium Deoxycholate | 414.55 | 12 | ≈4-5 kDa | 9 | No |
| Beta Octyl Glucoside | 292.37 | 27 | ≈8 kDa | 9 | No |
| Lauryl Dimethylamine N-oxide | 229.40 | 75 | ≈17 kDa | 12 | partial |
| Triton X-305 ™ | ≈1500 | 26 | ≈39 kDa | 30 | Yes |
| DDM | 510.62 | 150 | ≈72 kDa | 12 | Yes |
| Triton X-100 ™ | 647 | 100 | ≈90 kDa | 10 | Yes |
| Sodium Oleate | 304.44 | 950 | ≈300 kDa | 20 | Yes |

Example 12

The micelle size of the starting detergent is important for Nanonet formation.

Figure 7A:
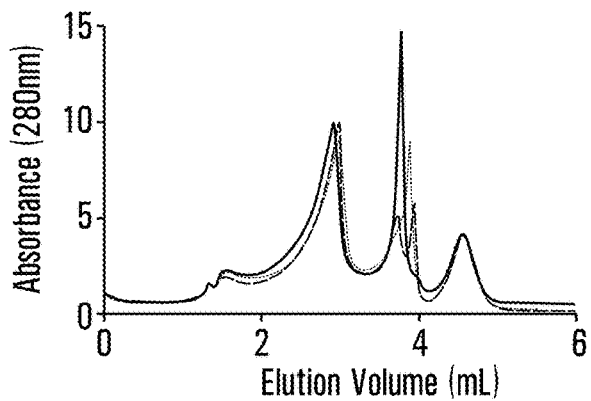
FIG. 7A: depicts the results of size exclusion chromatography of 1:1 (wt/wt) Nanonet formulation using the polymer (SMA 2000™) and detergents that form<20 kDa micelles. Nanonet formulations with β-octyl glucoside, Sodium Cholate, and lauryl dimethylamine.

FIG. 7A depicts the results of size exclusion chromatography of 1:1 (wt/wt) Nanonet formulation using detergents that form<20 kDa micelles. Nanonet formulations with β-octyl glucoside, Sodium Cholate, and lauryl dimethylamine, were subjected to size exclusion chromatography in distilled water. The Nanonets were prepared by mixing the detergent with the same polymer, SMA 2000™ in a 1:1 wt/wt ratio in distilled water. The Nanonets were tracked by UV absorbance at 280 nm. The results for the all of these three non-micelle forming detergents are substantially the same.

Figure 7B:
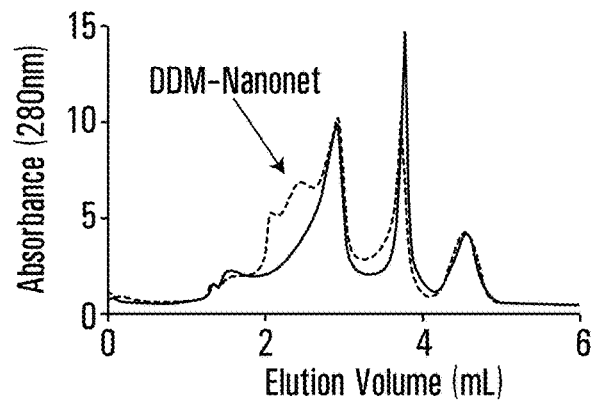
FIG. 7B: depicts the results of the same experiment as set out above for FIG. 7A, except that it was repeated and included an additional Nanonet prepared using dodecyl-maltoside (DDM) as the detergent (identified by arrow).

FIG. 7B depicts the results of the same experiment as set out above for FIG. 7A, except that it was repeated and included an additional Nanonet prepared using dodecyl-maltoside (DDM) as the detergent (identified by arrow). The results for the all of the non-micelle forming detergents (beta-octyl glucoside, sodium cholate and lauryl dimethylamine) are substantially the same and substantially the same as set out in the results in FIG. 7A, but the DDM nanonet, which does form a micelle shows a shift to the left of the elution curve.

Figure 7C:
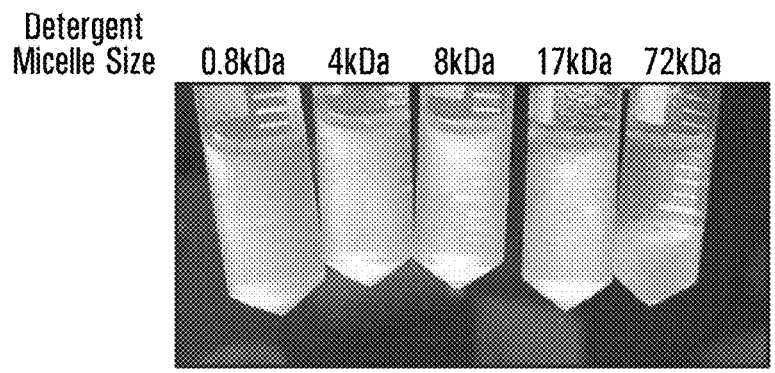
FIG. 7C: depicts the results of acid precipitated floc formation with polymer (SMA 2000™) detergent mixtures each having differently sized micelles (0.8 kDa, 4 kDa, 8 kDa, 17 kDa and 90 kDa).

FIG. 7C depicts the results of acid precipitated floc formation with polymer (SMA 2000™) detergent mixtures. Each tested detergent forms a differently sized micelle (0.8 kDa, 4 kDa, 8 kDa, 17 kDa and 72 kDa as indicated in example 11). The results show that Nanonets prepared with micelles of 0.8 kDa, 4 kDa, and 8 kDa, show no significant improvement in visible turbidity. The Nanonet prepared with a micelle of 17 kDa shows a minor improvement in visible turbidity and the Nanonet prepared with a micelle of 72 kDa shows a massive improvement in flocculation and hence removes turbidity.

Figure 7D:
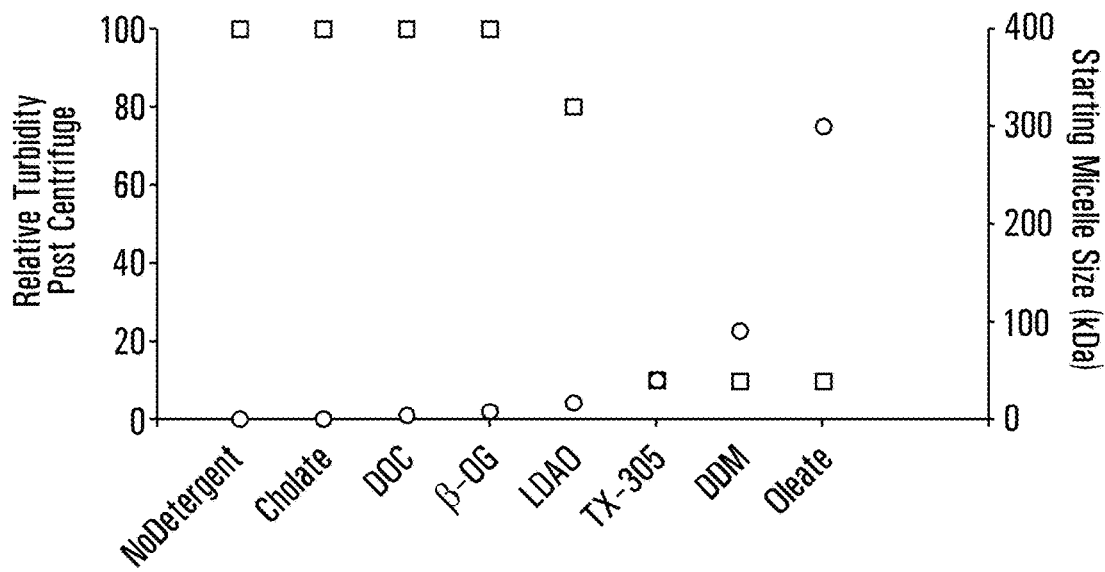
FIG. 7D: depicts graphically the relationship between floc agglomeration (stimulated by light centrifugation) of 8 different polymer mixtures (SMA 2000™+: no detergent (i.e. SMA 2000™ only), Sodium Cholate (Cholate), Sodium Deoxycholate (DOC), beta-octyl glucoside (Beta-OG), Lauryl dimethylamine n-oxide (LDAO), Octylphenol Ethoxylate (TX-305), n-Dodecyl beta-D-maltoside (DDM) and Sodium Oleate (Oleate) The circles in the graph relate starting micelle size and the squares in the graph relate to relative turbidity. Note that the circle and the square of the polymer+TX-305 are in approximately the same place and on top of each other.

FIG. 7D depicts graphically the relationship between floc agglomeration (stimulated by light centrifugation) of 8 different polymer mixtures (SMA 2000™+: no detergent (i.e. SMA 2000™ only), Sodium Cholate (Cholate), Sodium Deoxycholate (DOC), beta-octyl glucoside (Beta-OG), Lauryl dimethylamine n-oxide (LDAO), Octylphenol Ethoxylate (TX-305), n-Dodecyl beta-D-maltoside (DDM) and Sodium Oleate (Oleate). The circles in the graph relate starting micelle size and the squares in the graph relate to relative turbidity. Note that the circle and the square of the polymer+TX-305 are in approximately the same place and on top of each other. Only Nanonet forming mixtures show increased floc agglomeration.

Example 13

Demonstration of Nanonet formation and ratios for flocculation.

Figure 8A:
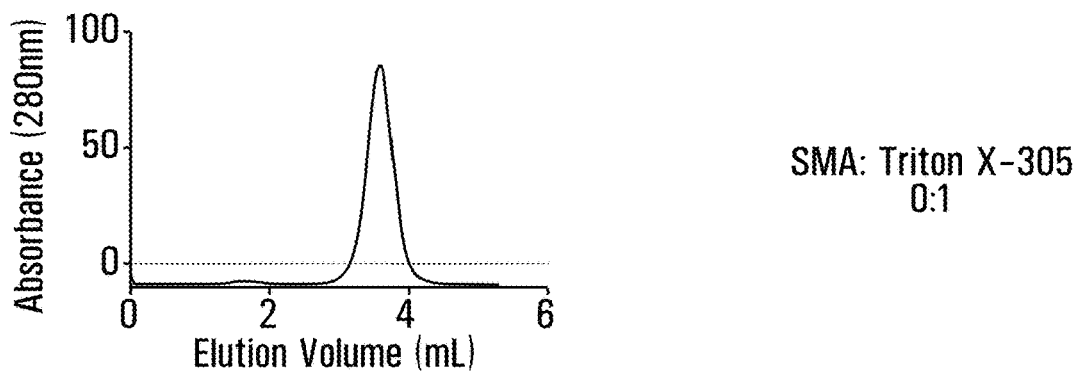
FIG. 8A: depicts the results of a size exclusion chromatography trace of Triton X-305™ alone.
Figure 8B:
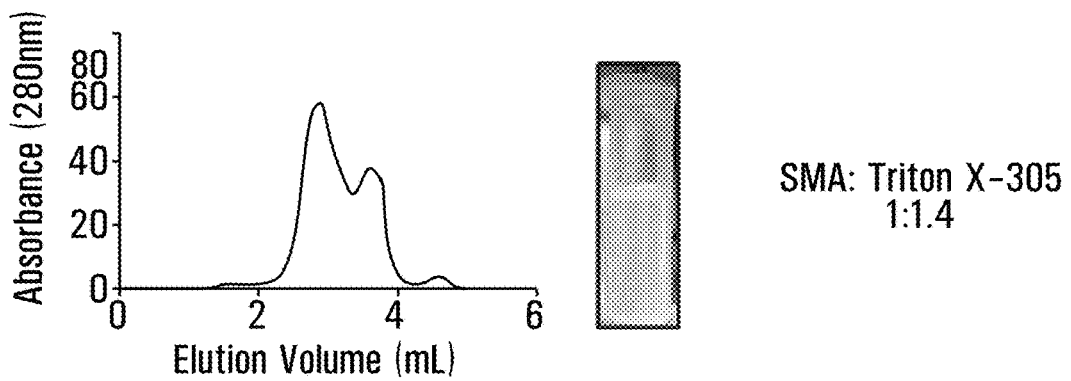
FIG. 8B: depicts the results of a size exclusion chromatography trace of Triton X-305™ Nanonet formulation at 1:1.4 (wt/wt) ratio of polymer to detergent. The inset depicts precipitation resulting in coagulation and capture of 2% N-Decane.
Figure 8C:
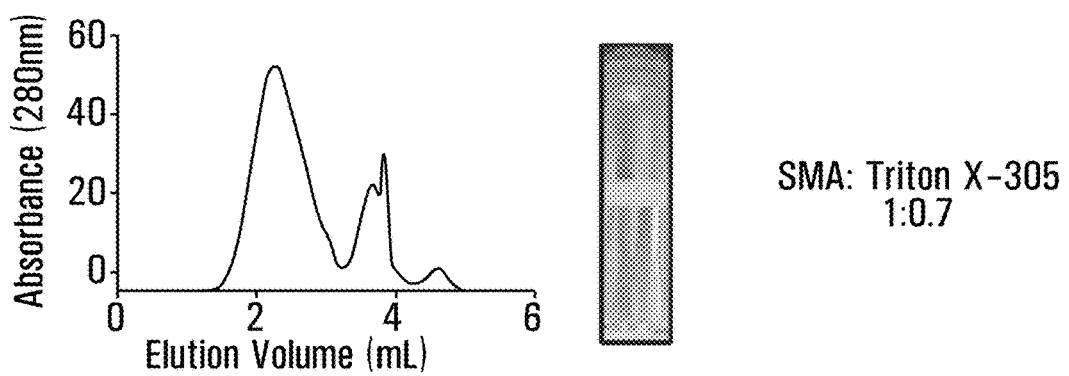
FIG. 8C: depicts a size exclusion chromatography trace of Triton X-305™ Nanonet formulation at 1:0.7 (wt/wt) ratio of polymer to detergent. The inset depicts precipitation resulting in coagulation and capture of 2% N-Decane.
Figure 8D:
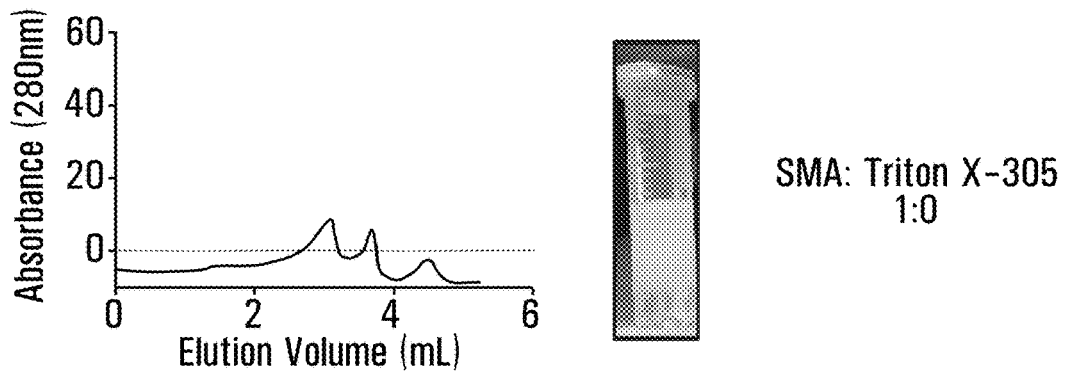
FIG. 8D: depicts a size exclusion chromatography trace of polymer alone. The inset depicts precipitation in presence of 2% N-Decane.

Four different ratios of SMA 2000™ polymer to Triton X-305™ were used to prepare four different sequestering agents. Each of these four sequestering agents were then added to a solution of 2% N-Decane The first (FIG. 8A) had a ratio of 0:1 (SMA:TX-305). The second (FIG. 8B) had a ratio of 1:1.4 (SMA:TX-305) and because there is too much detergent in the mixture, the precipitation reaction is inefficient, leading to poor flocculation. The third (FIG. 8C) had a ratio of 1:0.7 (SMA:TX-305) and because the Nanonet's form efficiently, the flocculation is efficient and the resulting solution is clarified and oil captured. The fourth (FIG. 8D) had a ratio of 1:0 (SMA:TX-305) and because the polymer is extended the polymer creates large sludge that is difficult to remove from the solution and does not efficiently capture the oil.

Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Numeric ranges are inclusive of the numbers defining the range. Furthermore, numeric ranges are provided so that the range of values is recited in addition to the individual values within the recited range being specifically recited in the absence of the range. The word "comprising" is used herein as an open-ended term, substantially equivalent to the phrase "including, but not limited to", and the word "comprises" has a corresponding meaning. As used herein, the singular forms "a", "an" and "the" include plural references unless the context clearly dictates otherwise. Thus, for example, reference to "a thing" includes more than one such thing. Citation of references herein is not an admission that such references are prior art to the present invention. Furthermore, material appearing in the background section of the specification is not an admission that such material is prior art to the invention. Any priority document(s) are incorporated herein by reference as if each individual priority document were specifically and individually indicated to be incorporated by reference herein and as though fully set forth herein. The invention includes all embodiments and variations substantially as hereinbefore described and with reference to the examples and drawings.

What is claimed is:

1. A sequestering agent for sequestering non-water moieties from an aqueous solution comprising:
   a) a detergent able to form a micelle having a size of not less than about 10 kDa, wherein the detergent is selected from the group consisting of: 2-[4-(2,4,4-trimethylpentan-2-yl)phenoxy]ethanol ($C_{14}H_{22}O(C_2H_4O)_n$, (n=9-10)), 2-[4(2,4,4-trimethylpentan-2-yl)phenoxy]ethanol ($C_{14}H_{22}O(C_2H_4O)_n$ (n=30)), N-dodecyl-beta-D-maltoside (DDM), sodium oleate, and mixtures thereof; and
   b) a polymer having a molecular weight in a range of from about 3,000 g/mol to about 25,000 g/mol selected from the group consisting of styrene-maleic acid (SMA), Di-isobutyl maleic acid, and mixtures thereof.

2. The sequestering agent of claim 1 further comprising a precipitation agent selected from the group consisting of acetic acid, malic acid, citric acid, tartaric acid, fumaric acid, lactic acid, hydrochloric acid, sulfuric acid, and phosphoric acid and mixtures thereof.

3. The sequestering agent of claim 1 wherein the polymer has a molecular weight of about 22,000 g/mol.

4. The sequestering agent of claim 1 wherein the polymer is water soluble.

5. The sequestering agent of claim 1 wherein the ratio of detergent:polymer is in a range of from about 1:0.5 to about 1:1.3.

6. The sequestering agent of claim 1 wherein the ratio of detergent:polymer is in a range of from about 1:0.5 to about 1:1.0.

7. The sequestering agent of claim 1 wherein the ratio of detergent:polymer is in a range of from about 1:0.6 to about 1:0.8.

8. The sequestering agent of claim 1 wherein the ratio of detergent:polymer is about 1:0.7.

9. The sequestering agent of claim 1 wherein the detergent is able to form a micelle having a size of not less than about 40 kDa.

10. The sequestering agent of claim 1 wherein the detergent is able to form a micelle having a size of not less than about 40 kDa and not more than about 300 kDa.

11. A kit for sequestering non-water moieties from an aqueous solution, the kit comprising:
   a) a detergent able to form a micelle having a size of not less than about 10 kDa, wherein the detergent is selected from the group consisting of: 2-[4-(2,4,4-trimethylpentan-2-yl)phenoxy]ethanol ($C_{14}H_{22}O(C_2H_4O)_n$ (n=9-10)), 2-[4-(2,4,4-trimethylpentan-2-yl)phenoxy]ethanol ($C_{14}H_{22}O(C_2H_4O)_n$, (n=30)), N-dodecyl-beta-D-maltoside (DDM), sodium oleate, and mixtures thereof;
   b) a polymer having a molecular weight in a range of from about 3,000 g/mol to about 25,000 g/mol selected from the group consisting of styrene-maleic acid (SMA), Di-isobutyl maleic acid, and mixtures thereof; and
   c) a precipitation agent selected from the group consisting of: acetic acid, malic acid, citric acid, tartaric acid, fumaric acid, lactic acid, hydrochloric acid, sulfuric acid, phosphoric acid, and mixtures thereof.

12. The kit of claim 11 wherein the polymer has a molecular weight of about 22,000 g/mol.

13. The kit of claim 11 wherein the polymer is water soluble.

14. The kit of claim 11 wherein the ratio of detergent:polymer is in a range of from about 1:0.5 to about 1:1.3.

15. The kit of claim 11 wherein the ratio of detergent:polymer is in a range of from about 1:0.5 to about 1:1.0.

16. The kit of claim 11 wherein the ratio of detergent:polymer is in a range of from about 1:0.6 to about 1:0.8.

17. The kit of claim 11 wherein the ratio of detergent:polymer is about 1:0.7.

18. The sequestering agent of claim 11 wherein the detergent is able to form a micelle having a size of not less than about 40 kDa.

19. The sequestering agent of claim 11 wherein the detergent is able to form a micelle having a size of not less than about 40 kDa and not more than about 300 kDa.

20. A method of sequestering a non-water moiety from an aqueous solution, the method comprising adding a sequestering agent of claim 1 to the aqueous solution comprising a non-water moiety, thereby forming a treated aqueous solution followed by removal of solid particles from the treated aqueous solution.

21. The method of claim 20 further comprising mixing prior to removal of solid particles.

22. The method of claim 20 wherein the removal of solid particles comprises at least one method of removal selected from the group consisting of: filtration, gravity separation, flotation and electromagnetic attraction.

23. The method of claim 20 wherein the removal of solid particles comprises electromagnetic attraction and the method further comprises adding magnetic moieties to the treated aqueous solution prior to removal of the solid particles.

* * * * *